(12) United States Patent
Beyer et al.

(10) Patent No.: US 6,251,328 B1
(45) Date of Patent: *Jun. 26, 2001

(54) DEVICE AND PROCESS FOR SHAPING WORKPIECES WITH LASER DIODE RADIATION

(75) Inventors: Eckhard Beyer, Roetgen-Rott; Volker Krause, Koenigswinter; Frank Kuepper; Hans-Georg Treusch, both of Aachen; Konrad Wissenbach, Wuerselen, all of (DE)

(73) Assignee: Fraunhofer-Gesellshcaft zur Foerderung der angewandten Forschung e.V., Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/945,381
(22) PCT Filed: Apr. 24, 1996
(86) PCT No.: PCT/DE96/00711
§ 371 Date: Jul. 8, 1998
§ 102(e) Date: Jul. 8, 1998
(87) PCT Pub. No.: WO96/33838
PCT Pub. Date: Oct. 31, 1996

(30) Foreign Application Priority Data

Apr. 24, 1995 (DE) .............................................. 195 14 285

(51) Int. Cl.[7] .................................................. B23K 26/00
(52) U.S. Cl. ............... 264/400; 219/121.62; 219/121.73; 219/121.76; 425/174.4; 425/385

(58) Field of Search .................................... 264/400, 1.37, 264/406, 40.6; 219/121.61, 121.62, 121.73, 121.76, 121.77, 121.82, 121.83, 121.85; 425/174.4, 385

(56) References Cited

U.S. PATENT DOCUMENTS

| | | | |
|---|---|---|---|
| 3,627,989 | * 12/1971 | Heidler et al. | 219/553 |
| 4,878,225 | 10/1989 | Aiba et al. | |
| 4,952,789 | * 8/1990 | Suttie | 219/121.68 |
| 4,963,714 | * 10/1990 | Adamski et al. | 219/121.63 |
| 5,228,324 | * 7/1993 | Frackiewicz | 72/342.1 |
| 5,446,258 | * 8/1995 | Mordlike | 219/121.66 |
| 5,578,229 | * 11/1996 | Barnekov et al. | 219/121.72 |
| 5,777,742 | * 7/1998 | Marron | 356/359 |

FOREIGN PATENT DOCUMENTS

| | | | |
|---|---|---|---|
| 40 10 054 | 10/1991 | (DE) . | |
| 0 317 830 | 5/1989 | (EP) . | |
| 62-110883 | * 5/1987 | (JP) | 264/121.73 |
| WO 94/26459 | 11/1994 | (WO) . | |

* cited by examiner

Primary Examiner—Jan H. Silbaugh
Assistant Examiner—Stefan Staicovici
(74) Attorney, Agent, or Firm—Evenson, McKeown, Edwards & Lenahan, P.L.L.C.

(57) ABSTRACT

A multiplicity of laser diodes aim laser light directly onto the surface of a workpiece and are disposed over and according to the to-be-shaped contour of a workpiece, so that a detector unit for determining the spatial shaping of the workpiece and an evaluation and control unit can determine process parameters for further illumination in dependence on a comparison of an actual state of shaping and a desired state of shaping of the workpiece.

11 Claims, 3 Drawing Sheets

DEVICE AND PROCESS FOR SHAPING WORKPIECES WITH LASER DIODE RADIATION

DESCRIPTION

1. Technical Field

The present invention relates to a device and a process for using laser diode radiation for shaping work pieces.

2. State of the Art

German patent document 43 16 829 discloses a generic type of process which was radiation for processing material, employing a multiplicity of diodes, preferably diode arrays arranged in groups, for processing work pieces. Using laser diodes for this type of work piece processing has the advantage over using conventional $CO_2$—, excimer and Nd-YAG lasers of reducing the complexity, time consumption and expense of these types of operating systems. Moreover, the cost and complex maintenance is considerably less than in the aforementioned laser systems.

The aforementioned German patent document discloses that, for controlled shaping of work pieces, the radiation energy of the laser diode acting on the work piece is controlled in dependence on the temperature distribution spreading over the surface of the work piece. In this way, the temperature distribution is determined in brief intervals and subsequently correspondingly brief influence is exercised on the diode output power and therewith on the beam profile. However, by simply determining the thermal conditions on the surface of the work piece, the momentary state of shaping of the to-be-processed work piece cannot be ascertained or only roughly so that only insufficient data are obtained concerning the further treatment of the work piece with laser light in order to obtain the desired degree of shaping. Furthermore, the laser light generated by the laser diodes is transmitted to the surface of the to-be-processed work piece with the aid of optical transmission elements using optical lenses or optical fiber cables, which entails a considerable loss of power.

DESCRIPTION OF THE INVENTION

The object of the present invention is, therefore, to provide a device and a process for shaping work pieces using laser diode radiation in such a way that, first, the processing procedure runs in a controlled manner until a desired final shape of the work piece has been obtained, so that a precise final shape is produced, and, secondly, that the optical setup contains as few as possible loss-producing components. Thus, the effectivity of the laser diodes remains as unhampered as possible.

A solution to the object of the present invention comprises a multiplicity of laser diodes, a detector unit for determining the spatial shaping of a workpiece and an evaluation and control unit which determines process parameters in dependence on a comparison of the actual state of shaping and a must state of shaping.

The present invention is based on the concept of providing online control with which the actual state of shaping is spatially/geometrically determined after each action of light and, in dependence thereof, the intensity of the laser light radiation impinging upon the work piece to be shaped is pinpointedly controlled.

An element of the present invention is that a device using laser diode radiation for shaping work pieces is provided with a multiplicity of laser diodes disposed over and according to the contour of the to-be-shaped work piece in such a manner that the laser light acts directly on the surface of the work piece. Following brief action of light on the work piece, the work piece deforms locally due to thermally induced material tensions. A detector unit determines the current state of spatial shaping of the work piece, by way of illustration with the aid of a holographic device. The spatial data of the shaped work piece gained with the detector unit are compared by an evaluation and control unit with a stored must state of shaping and the new process parameters required for triggering the laser diode are determined. Therefore, for further illumination of the work piece by the laser diodes the respective output power is controlled including the relative velocity between the laser diodes and the work piece, that is the spatial position of the laser diodes to the work piece.

With the aid of the invented control circuit, a must shaping state is produced in finite iteration steps based on the comparison of the current spatial configuration of the work piece, the so-called actual state, and the desired final state, the so-called must state. Constant comparison of the actual and the must state of the real geometric states is simply essential, because unknown internal stress can be present within the work piece causing the shaping process to run uncontrolledly. With the aid of the invented device and the process that can be conducted therewith, a controlled online process becomes feasible which individually controls, in dependence on the individual shaping behavior of the to-be-processed work piece, preferably the laser diode output power for the subsequent illumination process.

BRIEF DESCRIPTION OF THE DRAWINGS

The present invention is made more apparent in the following without the intention of limiting the scope or spirit of the invented idea using preferred embodiments with reference to the drawings to which reference explicitly is made for the disclosure of any invented ideas not explained in more detail herein.

DESCRIPTION OF A PREFERRED EMBODIMENT

Figure 1:
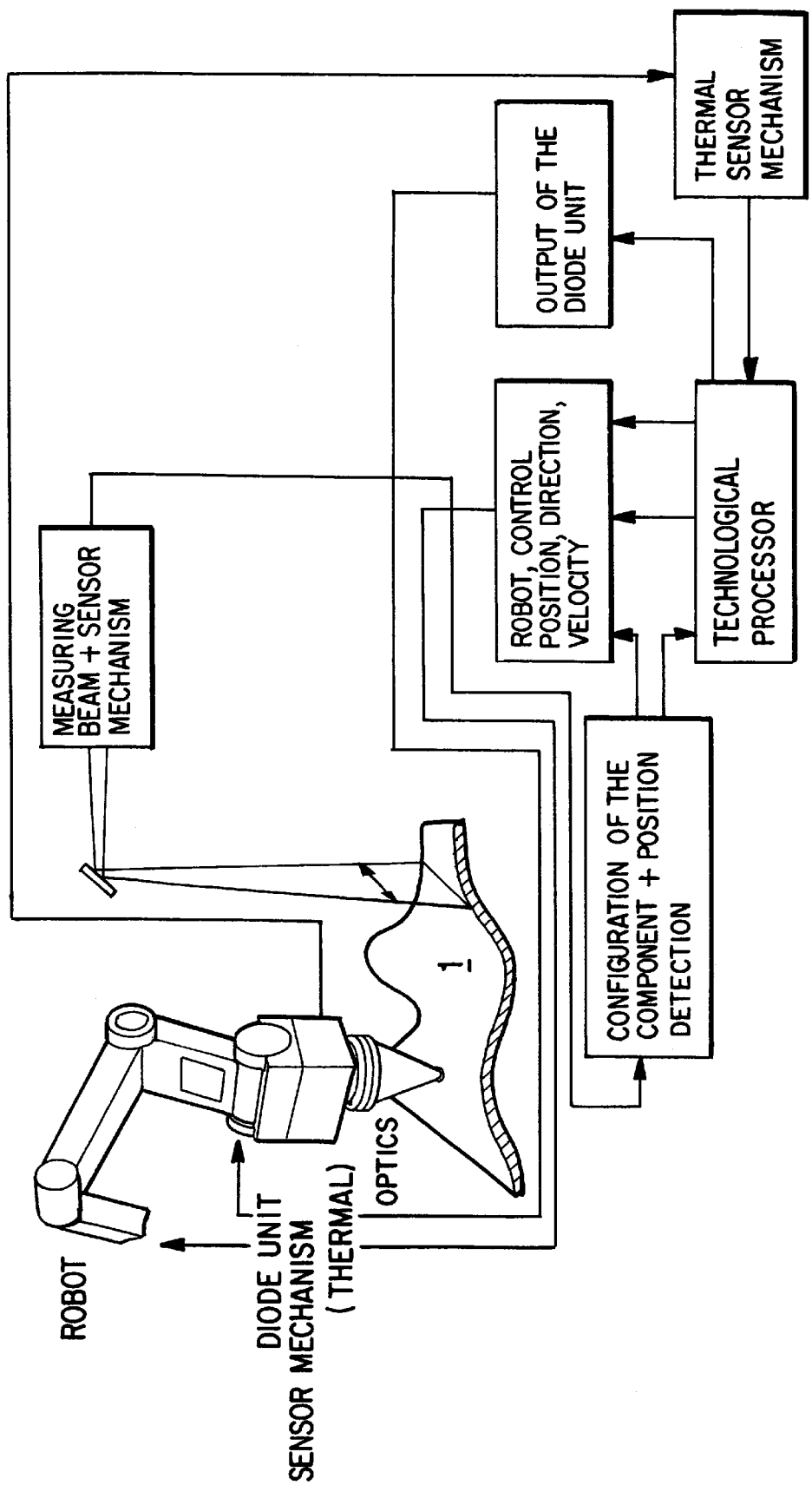
FIG. 1 is a functional block diagram of the invented process.

FIG. 1 shows a functional block diagram of the process describing the invented process for shaping work pieces. Diode units, which are not shown in more detail, are provided on an arm of a robot over a work piece 1 to be processed. The beam position of the diode units is aimed at the surface of the to-be-processed work piece 1. Following illumination of work piece 1, the degree of spatial shaping is determined with the aid of a measuring beam and the current configuration of the component is ascertained in a position determining unit. The acquired data are fed to a technology processor which determines the process parameters for further processing of the work piece. These parameters are transmitted to the robot for position correction and kinematic triggering and are utilized for controlling the output power of the laser diode unit.

With the newly determined process parameters, a new pulsed illumination process is conducted, leading again to further shaping of the work piece. This control process is repeated until the actual state corresponds to the desired must state. Moreover, the surface temperature of the work piece surface is determined via a thermal sensor mechanism supplementing the data on the course of the process.

Figure 2:
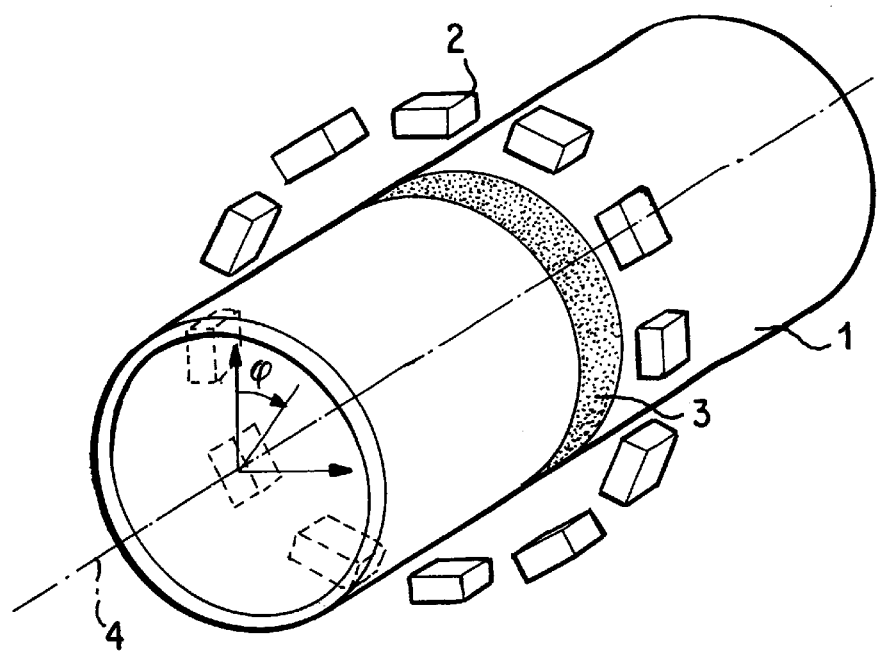
FIG. 2 is an arrangement for shaping a pipe.

FIG. 2 discloses a circular arrangement of laser diode groups 2 which is used for shaping a pipe-shaped work piece. A cross section 3, locally heated by means of beam energy, of a pipe 1, which is long in comparison (hatched region) to the heating zone, is plasticized by the flow hindrance of the surrounding material and widened or tapered following cooling, depending on the process and material parameters. The rotationally symmetrical arrangement of the individual diode arrays 2 permits circular heating of the cross section without turning the component. If the individual arrays are triggered in such a manner that, in dependence on the polar coordinates θ, different intensities at the circumference of the pipe are set, the shape of the pipe bends out of the axis of rotation 4. The direction of curvature of the pipe shape can be predetermined by controlling the diode output power and, if need be, monitored and controlled via path sensors.

It is essential that the laser diode arrays are arranged directly opposite the external contour of the work piece to be processed without imaging optical elements being connected therebetween. In this manner, the beam energy emitted from the laser diode impinges for the most part loss-free onto the surface of the to-be-processed work piece.

Figure 3:
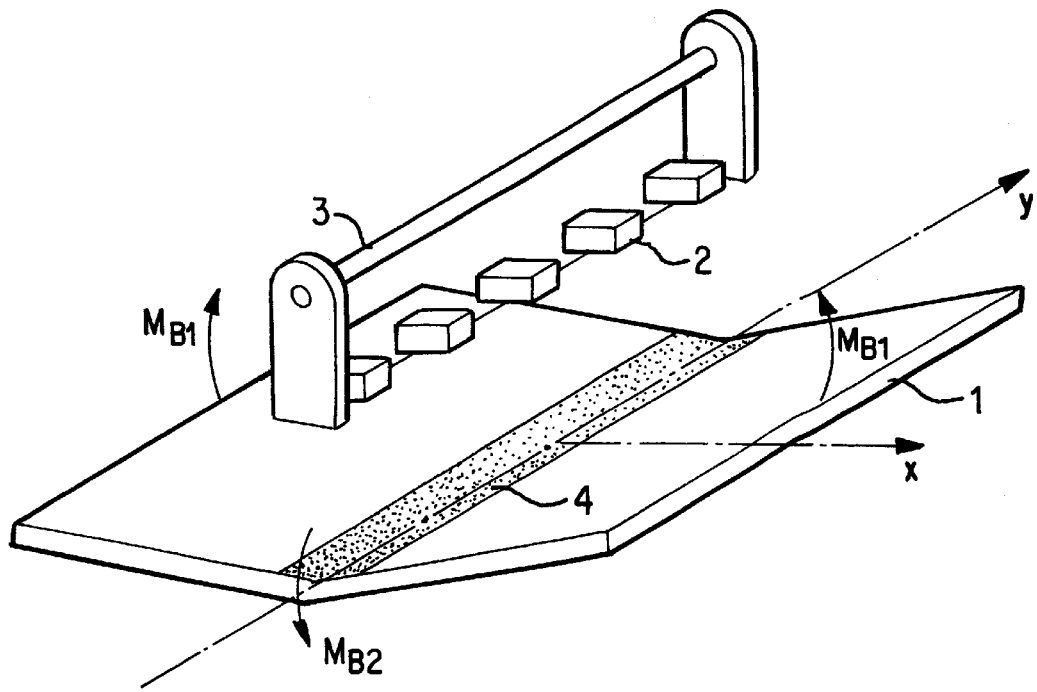
FIG. 3 is an arrangement for shaping a plane component.

FIG. 3 shows a laser diode arrangement with the aid of which plane components can be shaped along a folding line (see y-axis). A line or row arrangement of diode arrays 2 permits sharp-edged bends or folds 4 with a continuous radius of curvature. The predetermination of an output power profile along the folding line permits influencing stress distribution in the work piece in such a manner that solely a desired bending moment $M_{B1}$ is induced. This arrangement prevents the so-called anti-elastic effect, bending about the x-axis (bending moment $M_{B2}$).

Figure 4:
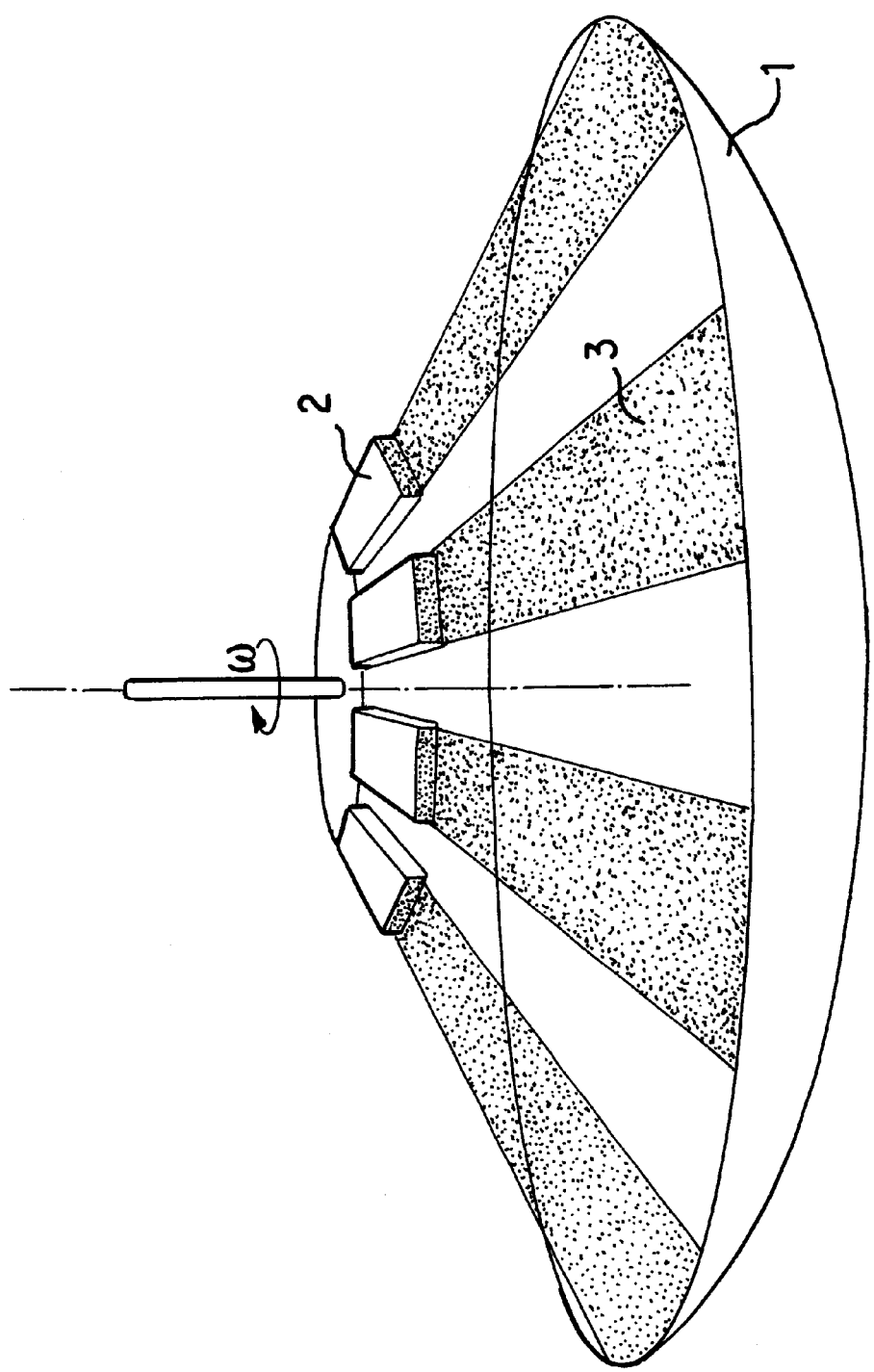
FIG. 4 is an arrangement for generating a spherical segment.

FIG. 4 shows a laser diode array arrangement with which spherical segments are produced from disk-shaped work pieces 1. For this purpose, individual laser diode arrays 2 are disposed moveably in the depicted manner on a surface describing the external contour of a truncated cone. The beam of the laser diode arrays 2 is directed onto the concavely shaped side 3 of the developing spherical segment. The diode arrays are borne in such a manner that the arrays move in an outward direction in dependence on an angle velocity ω. In this manner, processing of a circular disk 1 can be controlled by means of the angle velocity ω in such a way that the light impinges from the inside to the outside.

The relative movement between the diode arrays and work piece occurs either by rotating the diode arrays about the axis of rotation when the work piece is stationary or conversely by rotating the work piece when the diode arrays are stationary.

What is claimed is:

1. In an apparatus using laser diode radiation to shape a workpiece, said apparatus including a multiplicity of laser diodes disposed opposite a surface of the workpiece and an evaluation and control unit determining process parameters for said laser diodes, the improvement comprising:

said multiplicity of laser diodes being disposed in a configuration corresponding with a to-be-shaped contour of the workpiece;

each of said multiplicity of laser diodes aiming respective laser light directly onto different portions of said surface of the workpiece in accordance with said configuration;

a detecting unit for detecting an actual geometric spatial shape of the workpiece while said laser diodes are not impinging said laser light; and said evaluation and control unit determining further process parameters for said laser diodes in dependence on a comparison between the actual spatial shape and a desired shaping state of the workpiece.

2. The apparatus according to claim 1, wherein said process parameters include at least one of (a) a laser diode output power, (b) a relative velocity between the laser diodes and the workpiece, and (c) a spatial position of the laser diodes in relation to the workpiece.

3. The apparatus according to claim 1, wherein the multiplicity of laser diodes are disposed in one of a matrix and an array.

4. The apparatus according to claim 1, wherein the laser diodes are moveable with respect to the workpiece.

5. The apparatus according to claim 1, wherein the workpiece is moveable with respect to the laser diodes.

6. The apparatus according to claim 1, wherein the contour of the workpiece is cylindrical and the laser diodes are disposed rotationally around the cylindrical workpiece in a symmetrical manner.

7. The apparatus according to claim 1, wherein the contour of the workpiece is planar, the to-be-shaped contour has a folding line, and the laser diodes are disposed parallel to the folding line.

8. The apparatus according to claim 1, wherein the to-be-shaped contour is spherical, an initial contour of the workpiece is disk-shaped, and the laser diodes are disposed on a surface of the workpiece describing an external contour of a truncated cone.

9. The apparatus according to claim 8, wherein the laser diodes are aimed at a concave contour of the disk surface.

10. The apparatus according to claim 9, wherein the initial contour has a vertical axis which is also the axis of rotation around which said workpiece rotates with respect to said laser diodes or vice versa.

11. A process for shaping a workpiece using laser diode radiation, comprising the steps of:

arranging a multiplicity of laser diodes opposite a surface of a workpiece in a configuration spatially corresponding with a to-be-shaped contour of said workpiece;

impinging laser light from said diodes directly onto said to-be-shaped contour for a portion of the shaping process;

subsequently determining an actual geometric shaping state of the to-be-shaped contour while not impinging the laser light;

comparing the actual geometric shaping state with a desired-shaping state of the workpiece; and controlling laser diode output power of said laser diodes in dependence on said comparison step in a subsequent impinging step.

* * * * *